United States Patent
Carroll

[11] Patent Number: 5,850,854
[45] Date of Patent: Dec. 22, 1998

[54] PIPE CLOSURE

[76] Inventor: Norman Lee Carroll, 156 Merritt Dr., Butler, Pa. 16001

[21] Appl. No.: 942,466

[22] Filed: Oct. 2, 1997

[51] Int. Cl.$^6$ .............................. B65D 59/00; F16L 55/10
[52] U.S. Cl. ........................... 138/96 R; 138/89; 138/90; 138/158; 138/159
[58] Field of Search ................................ 138/96 R, 96 T, 138/89, 90, 156, 157, 158, 159

[56] References Cited

U.S. PATENT DOCUMENTS

| | | | |
|---|---|---|---|
| 3,499,469 | 3/1970 | Vizuete et al. | 138/90 |
| 3,993,102 | 11/1976 | Polster et al. | 138/96 T X |
| 4,330,266 | 5/1982 | Suey | 138/158 X |
| 4,616,679 | 10/1986 | Benton | 138/96 R X |
| 4,809,751 | 3/1989 | McKenzie | 138/89 |
| 4,887,646 | 12/1989 | Groves | 138/90 |
| 5,452,749 | 9/1995 | Johnson et al. | 138/96 T |
| 5,465,759 | 11/1995 | Carlson et al. | 138/96 R X |
| 5,678,607 | 10/1997 | Krywitsky | 138/96 R X |

FOREIGN PATENT DOCUMENTS 1363076  8/1974  United Kingdom ................... 138/159

*Primary Examiner*—Patrick F. Brinson
*Attorney, Agent, or Firm*—Daniel W. Ernsberger

[57] ABSTRACT

A reusable pipe closure is constructed using an O-ring end cap and split collar. In practice the end cap and O-ring are inserted over the end of a pipe, the split collar is placed over the end cap and the end of the pipe and the two halves of the split collar are closed; securely compressing the collar around the pipe.

3 Claims, 1 Drawing Sheet

PIPE CLOSURE

BACKGROUND OF THE INVENTION

Reusable pipe closures are an integral part of the pressure testing of pipes. The closures can be either free-end or restrained end closures and must withstand the maximum test pressures that may be used. The closures must be designed so that they do not cause failure of the specimen. Conventional closures generally form a seal with an O-ring or knife edge. The closures are generally secured to the pipe by inserting a wedge between the closure and the pipe to overcome the longitudinal, hoop and radial stresses that develop in the pipe during the course of testing that tend to dislodge and closure. During assembly these wedges often become imbedded in or firmly attached to the pipe wall. These conventional closures are not readily reused.

SUMMARY OF THE INVENTION

The novel closure of the present invention takes advantage of the stresses that develope in a pipe during testing to provide a secure closure with out a wedge. An O-ring and a split collar are used in the most preferred embodiment of the invention. The invention comprises: an end cap with an internal annular recess, an O-ring, secured against dislodgement by being positioned in the internal annular recess, a spilt collar with one cylindrical inner surface of substantially the same diameter as the outside diameter of a pipe for mounting to the outer surface of a pipe near the end of a pipe, and a second inner surface having substantially the same dimensions as the outer surface of the end cap, and a means for securing the split collar to a pipe. In practice, the end cap and O-ring are inserted over the end of the pipe, the split collar is placed over the end cap and the end of the pipe and the two halves of the split collar are closed; securely compressing the collar around the pipe. The end cap and O-ring prevent leakage and the collar secures the end cap in place. During testing the stresses that develop tend to expand the pipe, causing it to press more firmly against the collar thus securing it more firmly to the pipe. In the most preferred embodiment of the invention the collar is closed with a pair of transverse screws. The screws act as a fulcrum so that as the pipe expands the split collar will separate, slightly, where the pipe is expanding, and close, slightly, over the end cap. By this lever action, the expansion of the pipe is used to more securely retain the end cap. Once the test is complete, the system, including the pipe and the end cap, tends to relax, thus making it easier to disassemble the system and reuse the end cap.

GENERAL DESCRIPTION OF THE DRAWINGS

Figure one is a perspective view of an end cap and split collar attached to a pipe.

FIG. 2, and 3, are cut away and end views of an end cap with an internal annular recess and O-ring.

FIG. 4 and 5 are side and end views of the split collar. FIG. 4 is cut away to show the end cap and FIG. 5 is cut away to show a transverse screw.

DETAILED DESCRIPTION OF THE INVENTION

Figure 1:
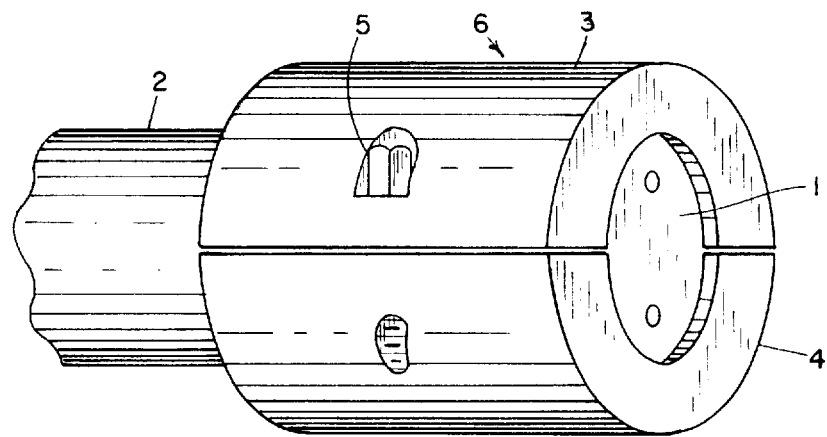

The end cap and split collar is generally shown in FIG. 1. The end cap, 1, is positioned over the end of a pipe, 2, and secured by two halves of split collar, 3, and 4. The collar is closed with one pair of transverse screws, 5 and 6. The screws pass through one half of the split collar, 3, and are threadedly engaged to the other half of the split collar, 4. While the two halves of the split collar can be secured to one another in many different ways the preferred way is to use transverse screws.

Figure 2:
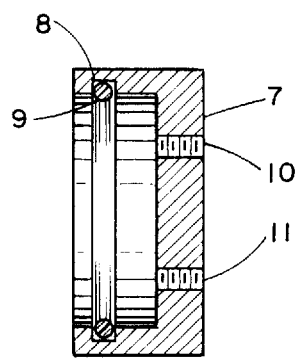
Figure 3:
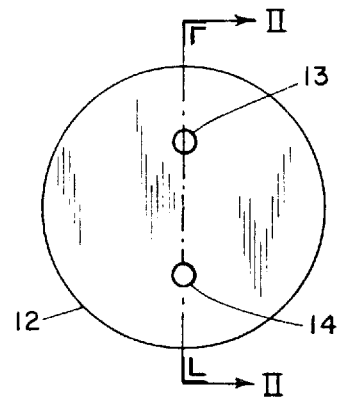

A cutaway of the end cap is shown in FIG. 2. The end cap, 7, has and internal annular recess, 8, and an O-ring 9. The end cap shown has two optional ports, 10 and 11, that may be used for the injection of fluid and removal of entrapped air during a test. The end view of the end cap, shown in FIG. 3, also shows the end cap, 12, and the optional ports 13, and 14. The O-ring is not shown.

Figure 4:
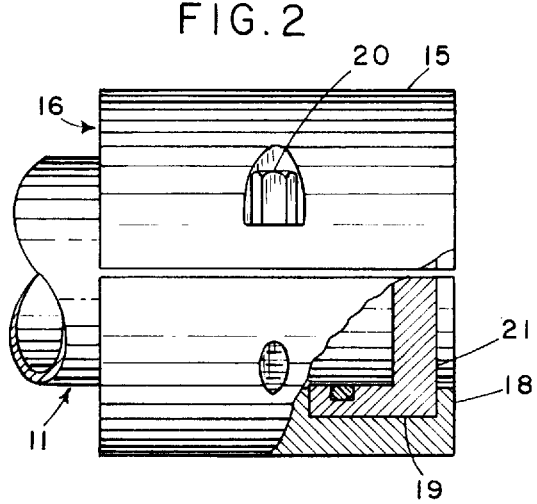
Figure 5:
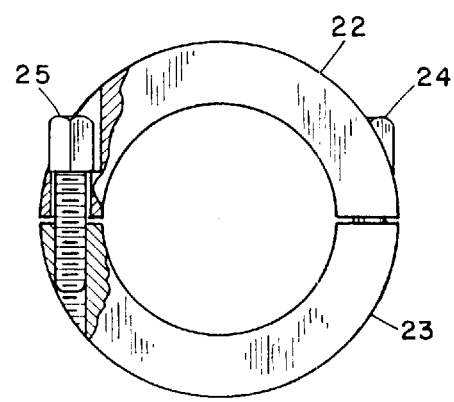

The side view of the split collar with the end cap and pipe in place, is shown in FIG. 4. The collar, 15, has a first lip, 16, that engages the pipe, 17, and a second lip, 18, that extends around the end cap, 19. The Collar is closed with one pair of transverse screws. The screws, 20, pass through the collar at the first lip, 16.

The end view of the split coller without the end cap or pipe in place, is shown in FIG. 4. The split collar has two halves, 22 and 23, which are closed with two transverse screws 24 and 25. The two screws pass through the first half of the split collar, 22, and are threadedly engaged in the second half of the spilt collar, 23.

During testing the pipe 17, expands and exerts pressure on the first lip, 16, thus making the attachment between the first lip, 16, and the pipe, 17, more secure. Under high pressure the expansion of the pipe can cause the two halves of the split collar to separate slightly within the vicinity of the first lip, causing the second lip, 18, to close on the end cap, 19. It is preferred that the second lip, 18, extend over the face of the end cap, 21, as shown. A plug with an external annular recess for an O-ring could be used in place of the end cap.

I claim:

1. A pipe closure comprising: an end cap placed on the end of a pipe, said end cap having an internal annular recess, an O-ring secured against dislodgement by being, positioned in the internal annular recess, a spilt collar placed over the end cap and the end of the pipe with each half comprising one cylindrical inner surface of substantially the same diameter as the outside diameter of the pipe for mounting to the outer surface of the pipe near the end of the pipe, and a second inner surface having substantially the same dimensions as the outer surface of the end cap, and a means for securing the split collar to the pipe.

2. The pipe closure in claim one wherein the means for securing the split collar comprises a pair of transverse screws passing through one half of the split collar and threadedly engaged to the second half.

3. The pipe closure of claim one wherein the second inner surface of the split collar has substantially the same dimensions as the outer surface of the end cap and a face of the end cap.

* * * * *